(12) United States Patent
Teraura et al.

(10) Patent No.: US 6,985,796 B2
(45) Date of Patent: Jan. 10, 2006

(54) METHOD OF CONTROLLING PHYSICAL DISTRIBUTION AND A PHYSICAL DISTRIBUTION CONTROLLING SYSTEM

(75) Inventors: Nobuyuki Teraura, Tokai (JP); Akira Shibata, Okazaki (JP)

(73) Assignee: Denso Corporation, Kariya (JP)

( * ) Notice: Subject to any disclaimer, the term of this patent is extended or adjusted under 35 U.S.C. 154(b) by 179 days.

(21) Appl. No.: 09/987,795

(22) Filed: Nov. 16, 2001

(65) Prior Publication Data

US 2002/0065577 A1 May 30, 2002

(30) Foreign Application Priority Data

Nov. 27, 2000 (JP) .................................... 2000-359338

(51) Int. Cl.
*G08F 7/00* (2006.01)

(52) U.S. Cl. ..................................... 700/229; 340/905
(58) Field of Classification Search ................ 700/229; 340/905
See application file for complete search history.

(56) References Cited

U.S. PATENT DOCUMENTS

| 5,532,692 | A | * | 7/1996 | Tatsuya .................. 340/825.54 |
| 5,557,096 | A | * | 9/1996 | Watanabe et al. ........... 235/492 |
| 5,691,980 | A | * | 11/1997 | Welles, II et al. .......... 370/316 |
| 5,815,114 | A | * | 9/1998 | Speasl et al. ................ 342/357 |
| 5,875,434 | A | * | 2/1999 | Matsuoka et al. ............ 705/28 |
| 5,917,433 | A |  | 6/1999 | Keillor et al. |
| 5,922,040 | A |  | 7/1999 | Prabhakaran |
| 5,923,014 | A |  | 7/1999 | Szymusiak et al. |
| 5,940,835 | A |  | 8/1999 | Sit |
| 6,056,195 | A |  | 5/2000 | Spain |
| 6,257,526 | B1 | * | 7/2001 | Taormina et al. ....... 244/158 R |
| 6,720,888 | B2 | * | 4/2004 | Eagleson et al. ........... 340/905 |
| 2003/0114206 | A1 | * | 6/2003 | Timothy et al. ............ 455/575 |
| 2003/0144985 | A1 | * | 7/2003 | Ebert ............................ 707/1 |

FOREIGN PATENT DOCUMENTS

| DE | 19805465 | 8/1999 |
| EP | 0531645 | 3/1993 |
| JP | 4-341414 | 11/1992 |
| JP | 6-111197 | 4/1994 |
| JP | A-7-85060 | 3/1995 |
| JP | 8-83283 | 3/1996 |
| JP | 11-296581 | 10/1999 |
| JP | 2000-292184 | 10/2000 |

\* cited by examiner

*Primary Examiner*—Donald P. Walsh
*Assistant Examiner*—Michael E Butler
(74) *Attorney, Agent, or Firm*—Posz Law Group, PLC

(57) ABSTRACT

A mail order firm receives a request for purchasing an article through Internet and the destination address. The terminal at the mail order firm converts the destination address into latitude and longitude position data to record it on an ID tag with a reader writer. The ID tag is attached to a freight containing the ordered article. A site receiving the freight reads the latitude and longitude position data to print or display the destination address in the language used by the site dealing with the freight. The deliverer can confirm that the present location where the freight is handed agrees with the latitude and longitude position data of the destination with navigating unit and GPS receiver.

16 Claims, 6 Drawing Sheets

METHOD OF CONTROLLING PHYSICAL DISTRIBUTION AND A PHYSICAL DISTRIBUTION CONTROLLING SYSTEM

BACKGROUND OF THE INVENTION

1. Field of the Invention

This invention relates to a method of controlling physical distribution for delivering a freight and a physical distribution control system for delivering a freight.

2. Description of the Prior Art

The destination of a freight is displayed on a label attached to the freight with character data in the language of the source of the freight. This method is inconvenient in physical distribution over different language countries. If the route to the destination has been determined, it is enough to indicate the destinations in languages on the route. However, if the route has not been determined, this is impossible.

SUMMARY OF THE INVENTION

The aim of the present invention is to provide a superior method of controlling physical distribution and a superior physical distribution control system.

According to the present invention, a first aspect of the present invention provides a method of controlling physical distribution comprising the steps of: recording position data including latitude and longitude data of destination of a freight on a recording medium provided to said freight; and controlling said physical distribution on the basis of said position data to deliver said freight.

According to the present invention, a second aspect of the present invention provides a method of controlling physical distribution based on the first aspect, further comprising the steps of: receiving an address of said destination through a communication network; and converting said address into said position data to record said position data on said recording medium.

According to the present invention, a third aspect of the present invention provides a method of controlling physical distribution based on the second aspect, wherein said step of converting said address comprising the step of converting a position of a gate at said address into said position data.

According to the present invention, a fourth aspect of the present invention provides a method of controlling physical distribution based on the first aspect, further comprising the steps of: providing a reader for reading said position data on said recording medium at sites; reading said position data by one of said sites which receives said freight; converting said position data read by said one of said sites into language data indicating said destination in a language used at an area where said one of sites exists; and indicating said position data with said language data.

According to the present invention, a fifth aspect of the present invention provides a method of controlling physical distribution based on the first aspect, further comprising the steps of: providing a reader for reading said position data on said recording medium at sites; reading said position data by one of said sites dealing with said freight; converting said position data into language data in a language used at an area of said one of sites dealing with said freight; and indicating said position data with said language data.

According to the present invention, a sixth aspect of the present invention provides a method of controlling physical distribution based on said first aspect, wherein said recording medium comprises an at least write once read memory, said method comprising the steps of: providing a reader for reading said position data on said recording medium; reading said position data; recording another position data of a place where said position data is read, said another position data includes another latitude and longitude data.

According to the present invention, a seventh aspect of the present invention provides a method of controlling physical distribution based on said first aspect, wherein said position data further includes altitude data of said destination.

According to the present invention, an eighth aspect of the present invention provides a method of controlling physical distribution based on said first aspect, further comprising the steps of: providing a map displaying unit and a GPS unit to deliverer for said physical distribution; converting said position data from said recording medium into map position data; and displaying a present position from said GPS unit and said map position data on said map displaying unit.

According to the present invention, a ninth aspect of the present invention provides a method of controlling physical distribution based on said first aspect, further comprising the steps of: providing a reader for reading said position data and a GPS unit to a deliverer for said physical distribution; comparing said position data with present position data from said GPS unit when said freight is handed; and outputting a result of said comparison.

According to the present invention, a tenth aspect of the present invention provides a physical distribution control system comprising: sites for receiving, forwarding, and delivering a freight; recording means for recording position data including latitude and longitude data of destination of said freight on a recording medium provided to said freight; and control means for controlling said physical distribution system on the basis of said position data to receive, forward, and deliver said freight.

According to the present invention, an eleventh aspect of the present invention provides a physical distribution control system based on the tenth aspect further comprising: receiving means for receiving said address of said destination through a communication network; and converting means for converting said address into said position data to record said position data on said recording medium.

According to the present invention, a twelfth eleventh aspect of the present invention provides a physical distribution control system based on the eleventh aspect wherein said converting means converts a position of a gate at said address into said position data.

According to the present invention, a thirteenth aspect of the present invention provides a physical distribution control system based on the tenth aspect, wherein each of said sites includes: a reader for reading said position data on said recording medium; converting means for converting said position data read by said reader into language data in a language used at an area where said one of sites exists; and indicating means for indicating said position data with said language data.

According to the present invention, a fourteenth aspect of the present invention provides a physical distribution control system based on the tenth aspect, wherein each of said sites comprising: a reader for reading said position data on said recording medium; converting means for converting said position data into language data in a language used at an area of one of said sites dealing with said freight; and indicating said position data with said language data.

According to the present invention, a fifteenth aspect of the present invention provides a physical distribution control system based on the tenth aspect, wherein said recording medium comprises an at least write once read memory, and each of said sites includes: a reader for reading said position data on said recording medium; and recording means for recording another position data of a place where said position data is read, said another position data includes another latitude and longitude data.

According to the present invention, a sixteenth aspect of the present invention provides a physical distribution control system based on the tenth aspect, wherein said position data further includes altitude data of said destination.

According to the present invention, a seventeenth aspect of the present invention provides a physical distribution control system based on the tenth aspect, wherein said sites include: deliverers, each includes: a map displaying unit and a GPS unit; converting means for converting said position data from said recording medium into map position data; displaying means for displaying a present position from said GPS unit and said map position data on said map displaying unit.

According to the present invention, an eighteenth aspect of the present invention provides a physical distribution control system based on the tenth aspect, wherein said sites include: deliverers, each includes: a reader for reading said position data and a GPS unit; comparing means for comparing said position data with present position data from said GPS unit when said freight is handed; and outputting means for outputting a result of said comparison.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

The physical distribution system according an embodiment of the present invention will be described with reference to drawings.

Figure 4:
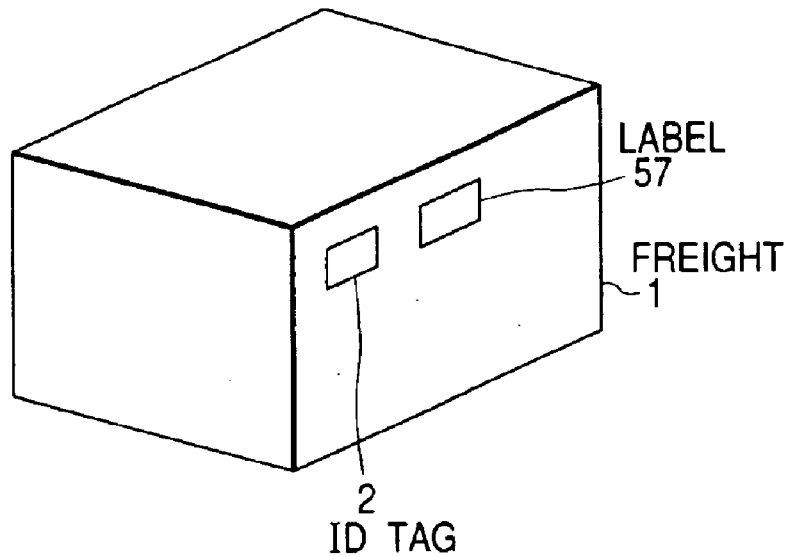
FIG. 4 is a perspective view of freight and an ID tag on the freight according to the embodiment.

FIG. 4 is a perspective view of a freight 1 to which a data recording medium 2 is attached or adhered. A sold good (article) is shipped as the freight 1 by a mail-order firm 55. The recording medium 2 comprises at least write once read memory which is adhered to the freight 1 as ID tag.

Figure 5:
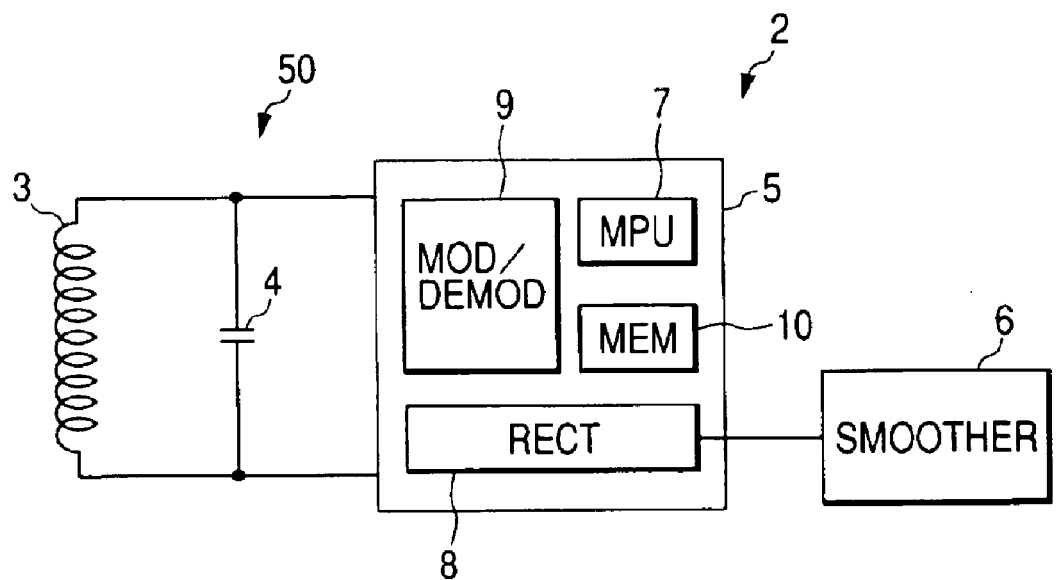
FIG. 5 is a block diagram of the ID tag shown in FIG. 4.

FIG. 5 is a block diagram of the ID tag 2. The ID tag 2 comprises an antenna coil 3 for receiving and transmitting radio wave signals, a resonance capacitor 4, a control IC 5, and a smoothing circuit 6.

The control IC 5 includes a microprocessor unit (MPU) 7, a rectifying circuit 8, a modulation/demodulation circuit 9, and a memory 10, which are formed on a semiconductor chip. The memory 10 comprises a non-volatile memory, i.e., an EEPROM, as the at least write once read memory.

The antenna coil 3 is connected in parallel with a resonance capacitor 4 to form a resonance circuit for receiving a radio wave power signal to supply the received radio wave power signal to the rectifying circuit 8. The rectifying circuit 8 and the smoothing circuit 6 form a power supply. That is, the rectifying circuit 8 rectifies the received power signal. The smoothing circuit 6 smoothes the rectified power signal to provide a dc power supply which is supplied to a control portion in the control IC 5.

The transmitted radio wave power signal carries a data signal by superimposing it on the radio wave power signal. That is, the resonance circuit 50 supplies the received radio wave power signal to the modulation/demodulation circuit 9 also. The modulation/demodulation circuit 9 demodulates the data signal and the demodulated signal is supplied to the microprocessor 7. The microprocessor 7 operates in accordance with programs and data stored in a ROM in a memory circuit 10 and with the received data signal. For example, the microprocessor 7 stores the data in the data signal in the EEPROM in the memory circuit 10 and modulates the data from the memory circuit 10 to transmit the data through the antenna coil 3.

Figure 6:
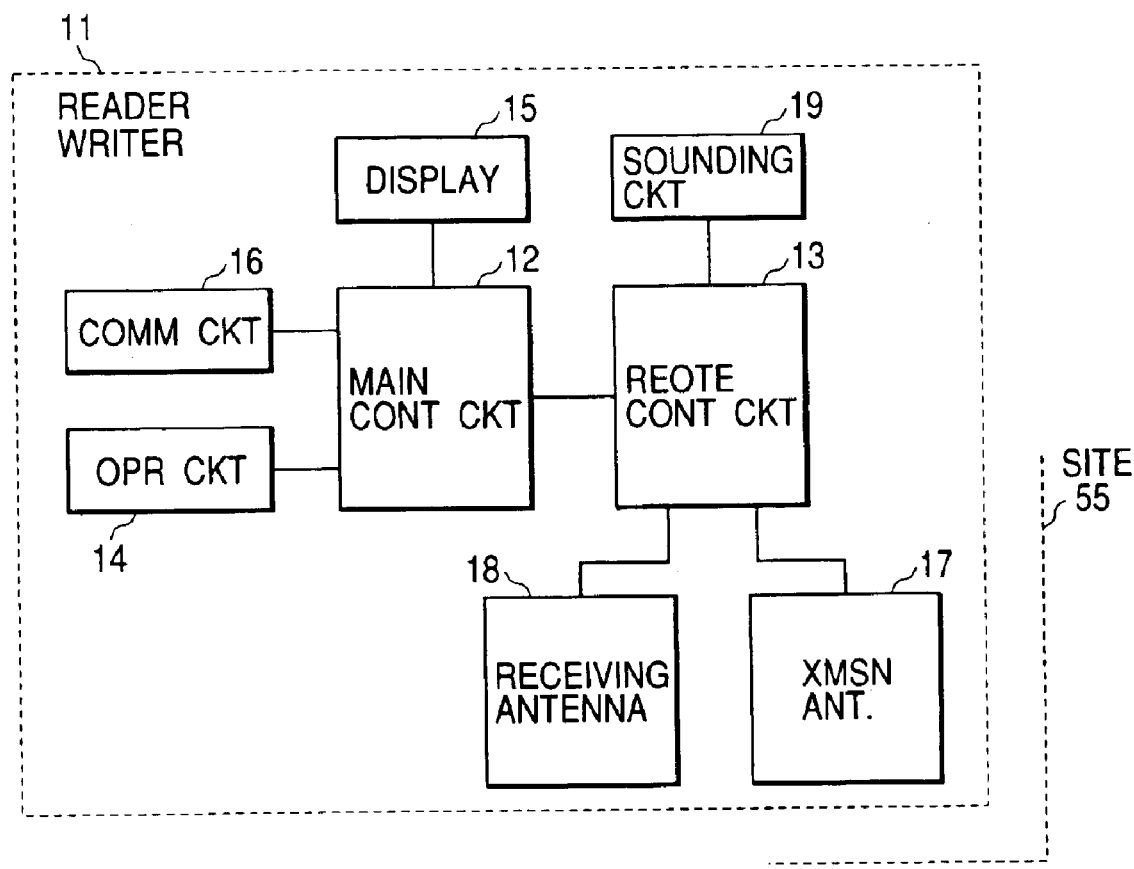
FIG. 6 is a block diagram of a reader writer provided to sites according to the embodiment.

FIG. 6 is a block diagram of a reader writer 11 according to this embodiment. The reader writer 11 writes data on the ID tag 2 and reading data on the ID tag 2 by transmitting data and reading data in response to command signals. The reader writer 11 includes a main control circuit 12 for bi-directional communication with a personal computer and a remote control circuit 13 for transmitting the radio wave power signal and receiving data signal from the ID tag 2. The main control circuit 12 has an operation unit 14 including a plurality of key switches, a display 15 comprising a liquid crystal display (LCD), and a communication circuit 16 having an interface (not shown) for communicating with a personal computer.

The remote control circuit 13 has a transmitting antenna 17 for transmitting the radio wave power signal and a receiving antenna 18 for receiving a radio wave signal from the ID tag 2, and a sounding circuit 19 for generating sound to inform completion of transmitting and receiving of data between the remote control circuit and the ID tag 2, such as a buzzer. The remote control circuit 13 keeps a transmitting condition that radio wave power signal is modulated with a reference signal during communication with the ID tag 2. When the remote control circuit 13 receives data from the main control circuit 12 to transmit the data to the ID tag 2, the remote control circuit 13 modulates the radio wave power signal with the data by superimposing on the radio wave power signal. The transmitting antenna 17 transmits the radio wave power signal which is modulated with the data.

Moreover, the remote control circuit 13 receives radio wave signal from the ID tag 2 and demodulates the received signal to obtain the data from the ID tag 2 to supply the data from the ID tag 2 to the main control circuit 12.

Figure 3:
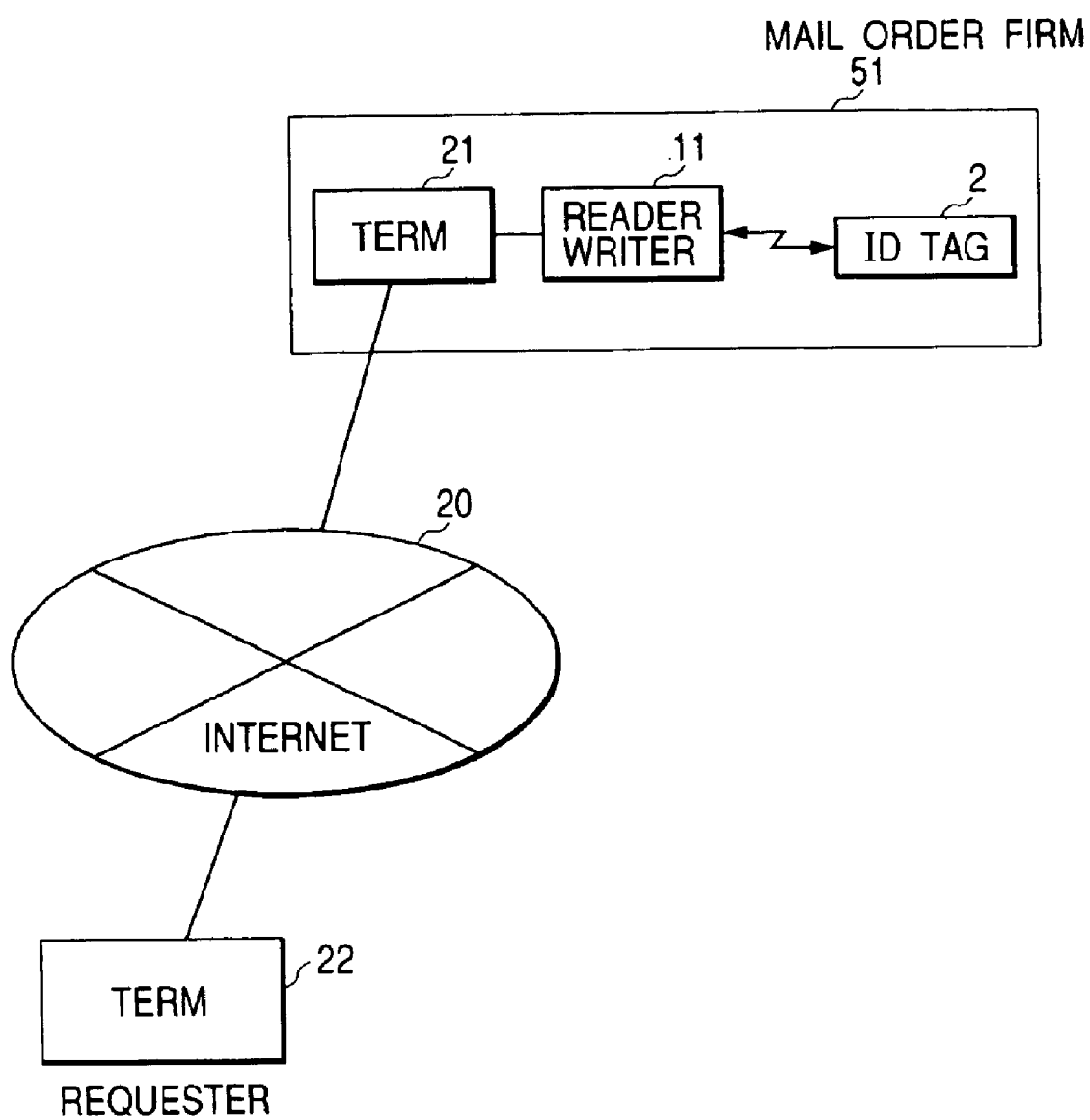
FIG. 3 is a block diagram of a system for receiving a mail order according to the embodiment of the invention.

FIG. 3 is a block diagram of a system for receiving a mail order including a computer network according to this embodiment. This system is provided to receive a request for ordering to purchase an article and for transporting a freight containing the article from not only a domestic requester but also a foreign requester by a mail-order firm 51. The mail-order firm 51 has a personal computer as a terminal 21 coupled to Internet 20 including a telephone network and the reader writer 11 coupled to the terminal 21. The Internet 20 is coupled to terminals 22 for domestic and foreigner requesters.

The terminal 21 receives a request and executes a predetermined request receiving operations including receiving an article name, the number of articles, a destination address, a source address of the requester from the terminal 22 of the requester through Internet 20.

The terminal 21 includes a latitude and longitude conversion database for converting an address at any place over the world into the latitude and longitude data by determining a position on a map in the database. Then, the terminal 21 determines latitude and longitude data of the destination from the transmitted address of destination. Moreover, if the requester lives at a high building and the address includes floor data indicating what floor the requester lives on, the terminal 21 converts the floor data into altitude data as position data. During this operation, the floor data may be converted by multiplying a standard height by the ordinal number of the floor.

Here, a requester may be a foreigner with respect to the mail-order firm 51. In this case, the terminal 21 translates the address into the address used in the database, wherein the format is also converted into the format used in the database. The database converts the translated address into the position data including the latitude and longitude data.

Figure 8:
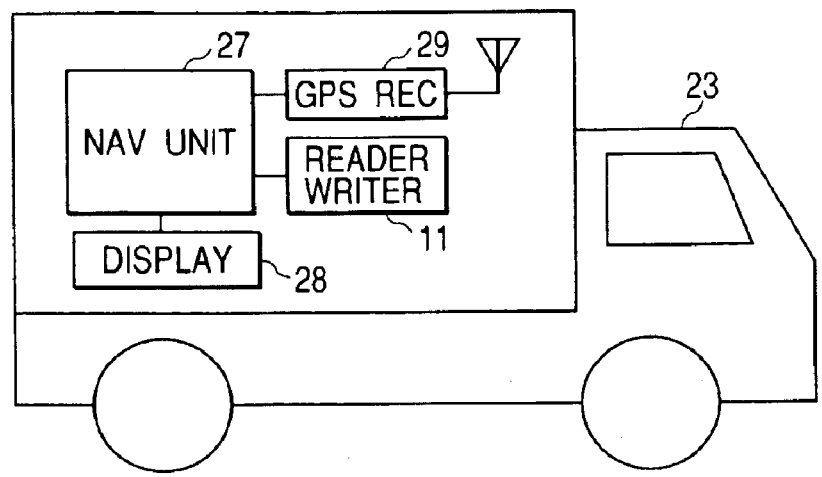
FIG. 8 is a block diagram of a deliverers' vehicle system according to the embodiment.
Figure 9:
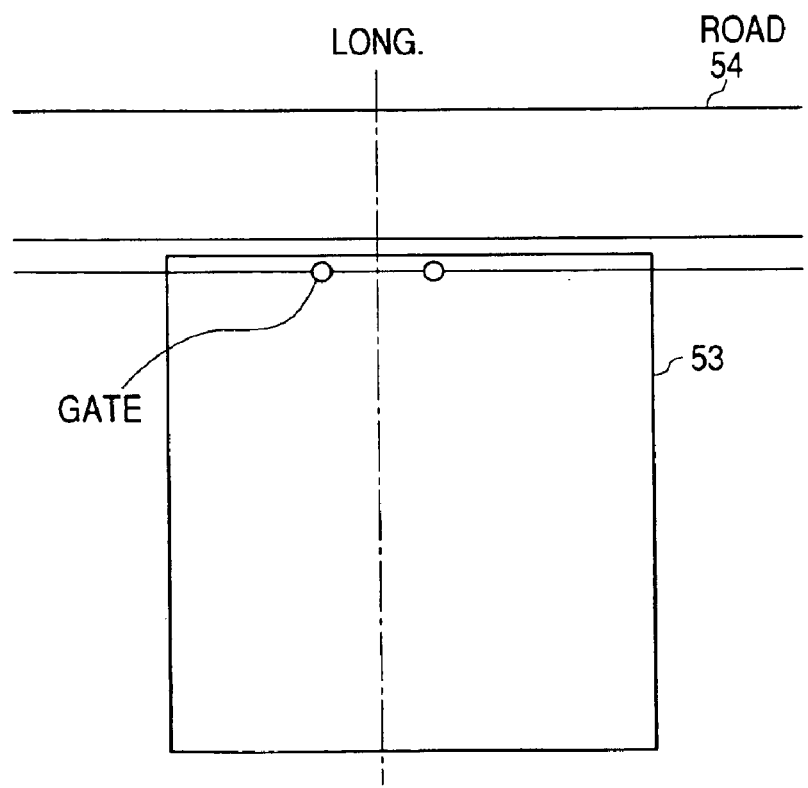
FIG. 9 is a plan view of a location of a destination address for determining the position data according to the embodiment.

FIG. 8 is an illustration of a vehicle of a deliverer according to the embodiment.

The reader writer 11 is provided to the vehicle 23 of a deliverer (site) as shown in FIG. 8 in addition to the mail-order firm 51 and sites for forwarding freight at airports, ports, stations.

The reader writer 11 at the mail-order firm 51 is coupled to the terminal 21. When the terminal 21 receives a request for delivering a freight from a requester 22 through Internet, the terminal 21 transmits a request for transmitting address of a destination. The terminal 21 receives the address and converts the address into position data including latitude and longitude data and altitude data which is supplied to the reader writer 11 as writing data. The reader writer 11 transmits the radio wave power signal baring the position data to the ID tag 2. The ID tag 2 stores the position data. More specifically, the terminal 21 generates writing data including an identification of the request, the type of the ordered article, date of the request in addition of the position data. The ID tag 2 stores the writing data. The ID tag 2 in which the writing data is stored is adhered or attached to the freight.

Figure 7:
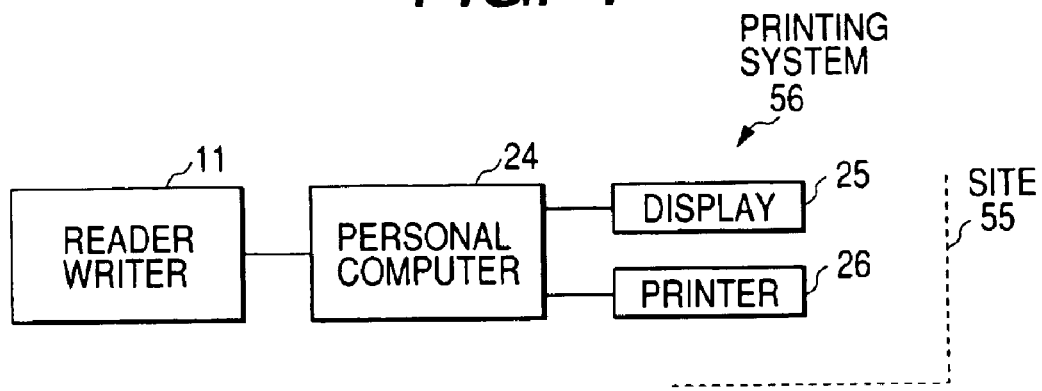
FIG. 7 is a block diagram of a printing system at sites according to the embodiment.

FIG. 7 is a block diagram of a printing system 56 at a forwarding site according to this embodiment. The printing systems 56 are provided to sites 55 for receiving, dealing with, and forwarding the freight at air ports, ports, or stations at various countries. The printing system includes the reader writer 11, a personal computer 24, a display 25, and a printer 26. The reader writer 11 is coupled to the personal computer 24 which includes a database for converting the position data into address in the language at the area where the freight is to be dealt with. The display 25 comprises a liquid crystal display (LCD) or the like. The printer 26 prints the address on a label 57 in the language at the area.

Moreover, at one of said sites 55 receiving or dealing the freight 1 reads the position data of the destination with the reader writer 11. The personal computer 24 converts the position data into language data indicating the destination in a language used at an area of the site 55 dealing with said freight and indicates said position data with said language data on the display 25 and prints the language data indicating the destination on a label 57.

Further, indication of the destination may be done with area code or the name of airport, port, or station. In this case, the personal computer 24 may determine another one of sites 55 to which the received freight is to be forwarded on the basis of the read position data, generate another site position data on the basis of address of another one of sites 55, convert the position data into language data in a language used at an area where another one of sites exists, and indicate or print the position data and another site position data with said language data.

The deliverer's vehicle 23 has a navigation unit 27, a display 28 such as LCD for displaying a map, and a GPS receiver (unit) 29 in addition of the reader writer 11.

The navigation unit 27 stores map data in a memory (not shown) to display the map on the basis of the map data and the present position detected by the GPS receiver 29 on the display 28. Moreover, the navigation unit 27 further displays the destination on the map on the basis of the position data read from the ID tag 2 through the reader writer 11. Moreover the navigation unit 27 displays the route to the destination on the displayed map and informs the user of turning points with voice during driving.

Figure 1:
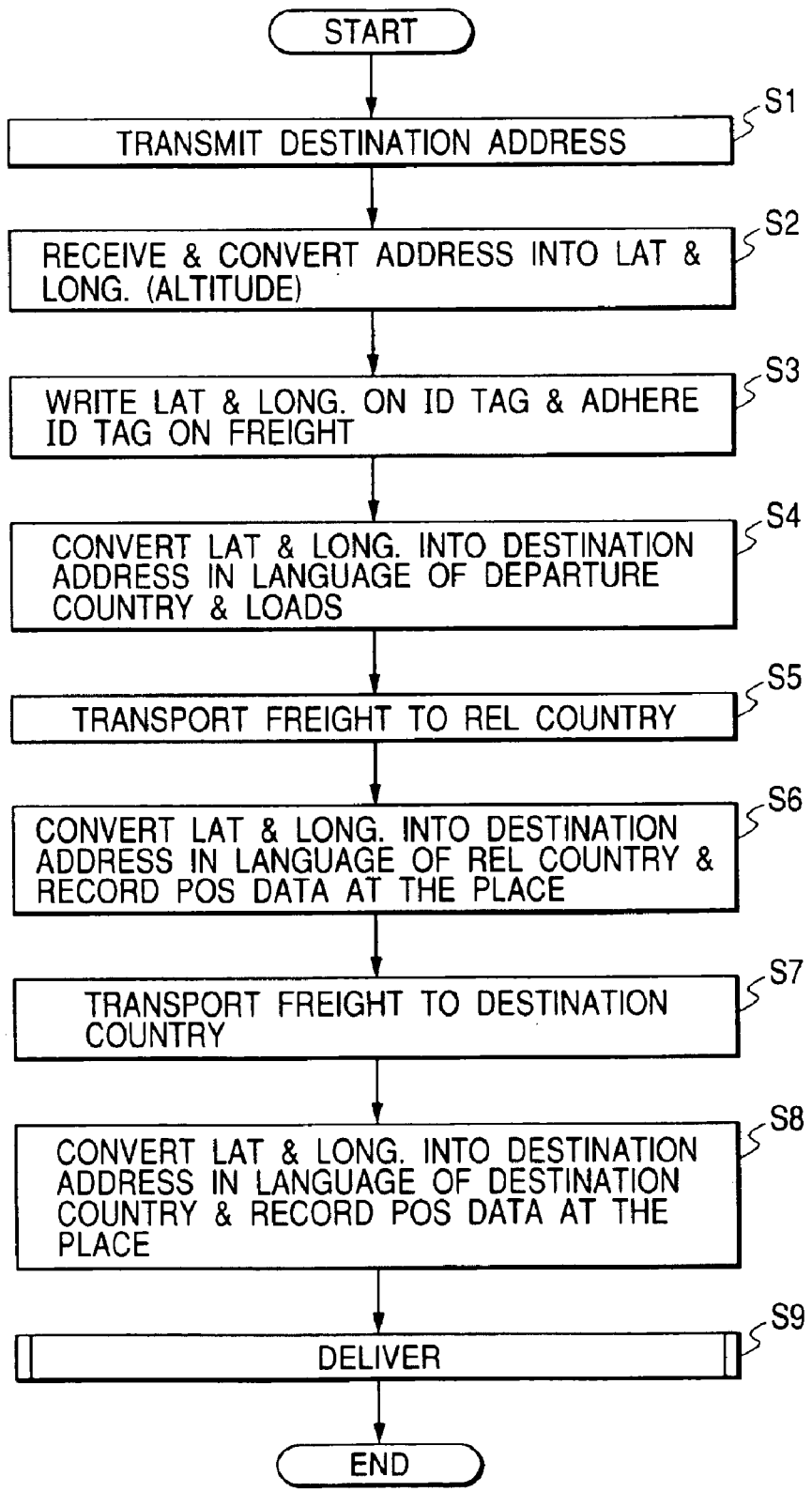
FIG. 1 depicts a flow chart illustrating processes in a physical distribution system according to the invention.

Process from receiving a request to completion of delivering will be described with assumption that the requester lives in a country which is different from the country of the mail-order firm 51 with reference to flow charts shown in FIGS. 1 and 2.

If a requester desires to purchase an article from a mail-order firm 51, the requester communicates with the terminal 21 of the mail-order firm 51 to transmit a request including the name or type of the desired article. In response to this, the terminal 21 transmits a request for transmitting address of the destination of the article. The terminal 21 receives the address of the destination in addition to the request in step S1. Here, an ordering form including spaces for the destination address, article name, etc. may be prepared in the home page of the site of the mail-order firm 51. In this case, the terminal 21 only receives the data from the terminal 22 of the requester.

The terminal 21 processes the order to prepare the article to be shipped and converts the address of the destination into position data including latitude and longitude data in step S2 with the database. Moreover, if the address includes the data of floor at the high building, the terminal 21 converts the data of the floor into altitude data which is included in the position data, in step S2.

Next, the terminal 21 transmits writing data including the identification number of the order, the name of the article, the data of the reception of the order, the date of shipment in addition to the position data to the reader writer 11. The reader writer 11 communicates with the ID tag 2 to send the writing data. The ID tag 2 writes the writing data on the memory 10. The ID tag 2 storing the writing data is adhered on the surface of the package of the freight 1 containing the ordered article in step S3. Then, the freight is shipped.

The freight 1 shipped by the mail-order firm 51 is transported by airplane, ship, railroad, or truck to the destination country. During this, at first, the freight 1 is transported to a site 55 of dealing with or forwarding freight in the same country. The site 55 reads the data stored in the ID tag 2 and stores the via-data including the position data including the latitude and longitude data of the site 55, date and time of dealing the freight in the ID tag 2 to indicate where and what time the freight 1 is loaded. More specifically, the receiving timing data and shipment data is recorded.

The reader writer 11 transmits the data read from the ID tag 2 to the personal computer 24. The personal computer 24 searches the address from the latitude and longitude data with reference to the database and prints the address of the destination in the language of the departure country on a label 57. The printed label 57 is adhered to the package of the freight 1. The operator loading the freight 1 in the departure country reads the data on the label 57 and loads the freight 1 on an airplane, a ship, or a freighter on the basis of the data on the label in step S4.

The airplane, ship, or freighter departing from the country of the sender transports the freight 1 to a relay country in step S5. The relay country may be plural or the freight 1 may be directly transmitted to the destination country.

The site 55 at a relay country reads the various data from the ID tag 2 on the freight 1 with the reader write 11 in the same as mentioned above. In addition, the reader writer 11 stores via-data including the latitude and longitude data and the altitude data of the site 55, the date and time when the operator of the site 55 deals with freight 1 on the ID tag2. The personal computer 24 prints the address of the destination from the positional data including the latitude and longitude data on a label 57. The label 57 is printed in the language of the relay country and is adhered to the freight 1. The operator at the site 55 reads the label 57 and loads the freight 1 on the service for the next destination on the basis of the language data in the label 57 in step S6.

The service (airplane, ship, or freighter) finally transports the freight 1 to the destination country in step S7. At the airport, port, or station of the destination country, the site 55 dealing with the fright 1 reads the various data from the ID tag2 on the freight 1 with the reader writer 11. The reader writer 11 stores the via-data including the position data of the site 55 and the data and time data when the site 55 deals with the freight 1 on the ID tag 2.

The reader writer 11 sends the data read from the ID tag 2 to the personal computer 24. The personal computer 24 searches the address of the destination from the latitude and longitude data with reference to the database and prints the address of the destination in the language of the destination country on a label 57. The label 57 is adhered to the freight 1 in step S8 and delivered in step S9.

As mentioned above, if indication of the destination is done with area code or the name of airport, port, or station, the personal computer 24 determines another one of sites 55 to which the received freight is to be forwarded on the basis of the read position data, generates another site position data on the basis of address of another one of sites 55, converts the position data into language data in a language used at an area where another one of sites exists, and prints the position data and another site position data with the language data in step S4.

Figure 2:
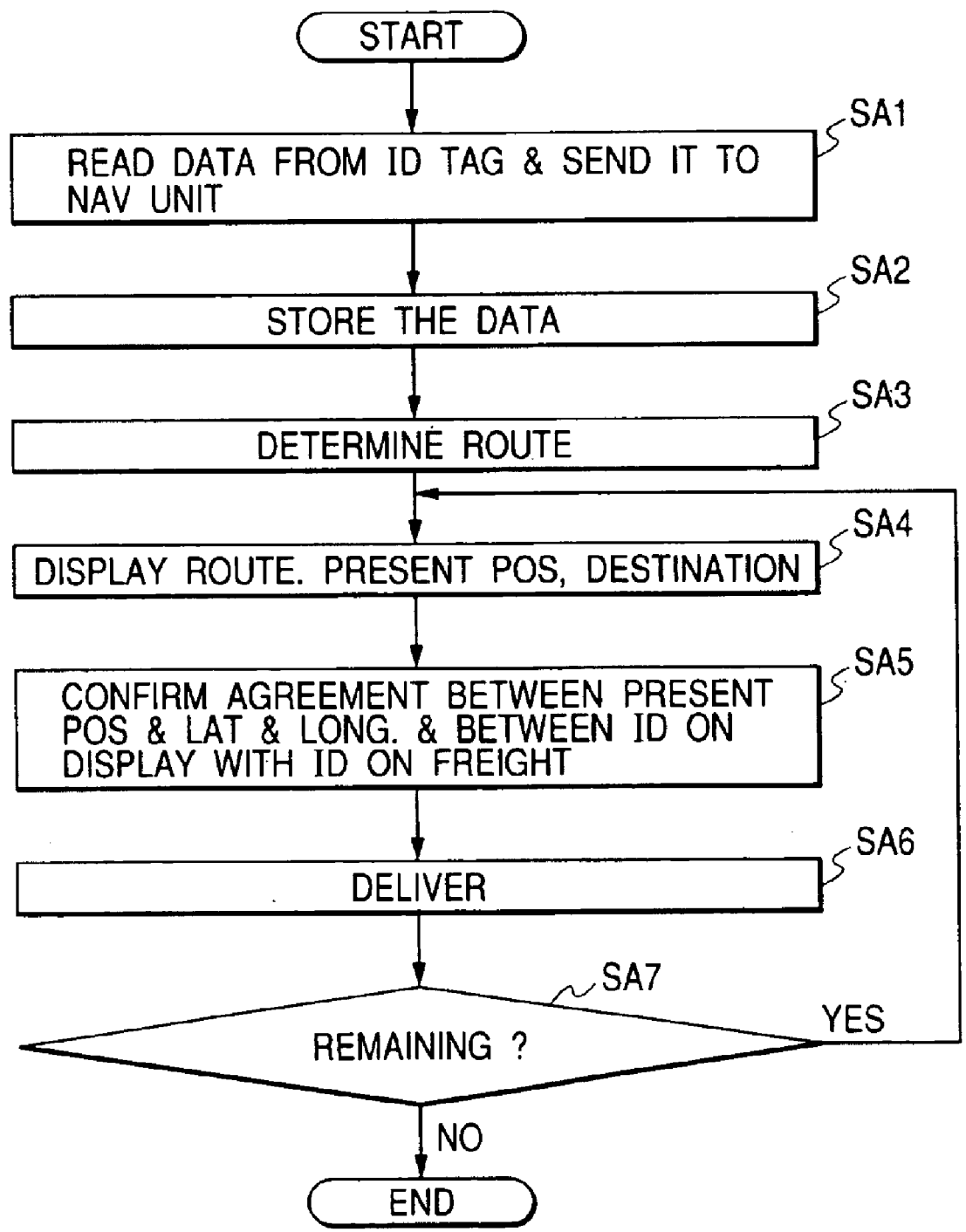
FIG. 2 depicts a flow chart illustrating a process done by a deliverer according to the embodiment of the invention.

FIG. 2 depicts a flow chart of operation at the deliverer's vehicle 23 according to the embodiment.

When an operator loads the freight 1 on the deliverer's vehicle (site) 23, the operator reads the various data from the ID tag 2 with the reader writer 11. The reader writer 11 sends the read data to the navigation unit 27 in step SA1. The navigation unit 27 stores the sent data in its memory (not shown) in step SA2. This operation is repeated if there are a plurality of freights to be delivered.

The navigation unit 27 detects the present position of the deliverer's vehicle 23 from the position signal received by the GPS receiver 29 and determines the optimal route to the destinations of the freights 1 from the position data of the freights 1 loaded on the deliverer's vehicle 23 stored in the memory in step SA3. The navigation unit 27 displays the route, the present position and locations of a plurality of freight on the deliverer's vehicle 23 on the map on the display 28 in step SA4.

When the deliverer's vehicle 23 reaches the destination of the freight 1, the operator displays the various data of the destination on the display 28 and searches the freight 1 from freights on the carrier of the vehicle 23 with the identification number of the freight 1. Moreover, the operator collates or compares the identification number, the latitude and longitude displayed on the label on the freight with the displayed data including the identification number, the latitude and longitude to confirm agreement therebetween in step SA5. Then, the operator hands the person at the destination the freight 1 in step SA6. During this operation, the operator removes the ID tab 2 from the freight 1 and stores the date and time on the ID tag 2 with the reader writer 11. The operator repeats this operation for all freights on the carrier of the deliverer's vehicle 23, that is, steps SA4 to SA6 are repeated until all freights have been delivered in step SA7. When all freights have been delivered, the delivering operation has completed. The ID tag 2 is returned to the mail-order firm 51 later.

According to this embodiment, the address of a destination is recorded on the ID tag 2 as latitude and longitude data which is universal position data, so that the location of the destination can be identified by reading the position data irrespective of languages used at the departure country, via-countries, and the destination country. This method and system provides favorable physical distribution among various countries. In addition, according to this embodiment, the altitude data is used for identifying the location of the destination in addition to the latitude and longitude data, so that if the destination is at a high building, the destination floor can be identified.

Moreover, according to this embodiment, if the destination address represented by a foreign language is transmitted from a requester through Internet 20 to the terminal 21 at the mail-order firm 51, the destination address is automatically translated and converted into latitude and longitude data, so that the requester is free from complicated operation.

Although the destination address is represented by the latitude and longitude data, the operator at an airport, a port, or a station can know the destination address with ordinal expression in its own language by using the reader writer 11 which reads the position data of the destination and the printer 26 prints the destination on the label 57 with the conventional expression its own language. Therefore, this method prevents miss-loading freight 1.

Moreover, the deliverer's vehicle 23 has the navigation unit 26 to display the present location and the destination location, so that the operator can hand the person at the destination the freight without errors. Moreover, the latitude and longitude data of the destination recorded on the ID tag 2 is compared with the present position detected by the GPS receiver 29. This prevents miss handing. Here, the latitude and longitude is represented at the gate 52 facing a road 54, so that the driver on the deliverer's vehicle can easily find the destination. During this, because the deliverer's vehicle 23 stops in front of the gate 52, it is accurate to compare the latitude and longitude data of the destination address with the latitude and longitude at the present location.

Moreover, the latitude and longitude data and altitude data at sites 55 dealing with the freight 1 is recorded on the ID tag 2, so that it is possible to obtain data of the route to the destination, the number of days for reaching, stagnation places, the number of stagnation days or the like. This provides favorable data to future planning.

There are various modifications of the present invention. For example, an operator can do converting the latitude and longitude recorded on the ID tag 2 into an address instead the terminal 21. Furthermore, as mentioned earlier, the address of the destination may be converted into the name of the airport, port, or station near the destination with the latitude and longitude data, wherein this name is used until the freight reaches there. Then, the final destination address is used. Moreover, the destination address may be converted into an area code which is defined in the physical distribution world with the latitude and the longitude data of the destination. The area code is expressed in the language used in the site 55 dealing with the freight.

Moreover, the deliverer operator may carry the navigation unit 26.

The recording medium may be a label recording one-dimensional code such as bar codes, or two-dimensional code such as QR codes. That is, the ID tag 2 comprises an at least write once read memory.

Moreover, this invention is applicable to general physical distribution.

What is claimed is:

1. A method of controlling physical distribution comprising the steps of:
   recording position data including latitude and longitude data of a destination of freight on a recording medium provided to said freight;
   controlling said physical distribution on the basis of said position data to deliver said freight;
   providing a reader for reading said position data on said recording medium at sites;
   reading said position data by one of said sites which receives said freight;
   converting said position data read by said one of said sites into language data indicating said destination in a language used within an area where said one of said sites exists; and
   indicating said position data with said language data.

2. A method of controlling physical distribution as claimed in claim 1, further comprising the steps of:
   receiving an address of said destination through a communication network; and
   converting said address into said position data to record said position data on said recording medium.

3. A method of controlling a physical distribution as claimed in claim 2, wherein said step of converting said address comprises converting a position of a gate at said address into said position data.

4. A method of controlling physical distribution as claimed in claim 1, wherein said recording medium comprises an at least write once read memory, said method comprising the steps of:
   providing a reader for reading said position data on said recording medium;
   reading said position data; and
   recording another position data of a place where said position data is read, wherein said another position data includes another latitude and longitude data.

5. A method of controlling physical distribution as claimed in claim 1, wherein said position data further includes altitude data of said destination.

6. A method of controlling physical distribution as claimed in claim 1, further comprising the steps of:
   providing a map displaying unit and a GPS unit to a deliverer for said physical distribution;
   converting said position data from said recording medium into map position data; and
   displaying a present position from said OPS unit and said map position data on said map displaying unit.

7. A method of controlling physical distribution as claimed in claim 1, further comprising the steps of:
   providing a reader for reading said position data and a GPS unit to a deliverer for said physical distribution;
   comparing said position data with present position data from said GPS unit when said freight is handed; and
   outputting a result of said comparison.

8. A method of controlling physical distribution comprising the steps of:
   recording position data including latitude and longitude destination data of freight on a recording medium provided to said freight;
   controlling said physical distribution based on said position data to deliver said freight;
   providing a reader for reading said position data on said recording medium at sites;
   reading said position data by one of said sites dealing with said freight;
   converting said position data into language data indicating said destination in a language used within an area of said one of said sites dealing with said freight; and
   indicating said position data with said language data.

9. A physical distribution control system, comprising:
   sites for receiving, forwarding, and delivering freight;
   recording means for recording position data including latitude and longitude destination data of said freight on a recording medium provided to said freight; and
   control means for controlling said physical distribution system based on said position data to receive, forward, and deliver said freight,
   wherein each of said sites includes:
     a reader for reading said position data on said recording medium;
     converting means for converting said position data read by said reader into language data in a language used within an area where said one of said sites exists; and
     indicating means for indicating said position data with said language data.

10. A physical distribution control system as claimed in claim 9, further comprising:
    receiving means for receiving said address of said destination through a communication network; and
    converting means for converting said address into said position data to record said position data on said recording medium.

11. A physical distribution control system as claimed in claim 9, wherein said converting means converts a position of a gate at said address into said position data.

12. A physical distribution control system as claimed in claim 9, wherein said recording medium comprises an at least write once read memory, and each of said sites includes:

a reader for reading said position data on said recording medium; and recording means for recording another position data of a place where said position data is read, said another position data includes another latitude and longitude data.

13. A physical distribution control system as claimed in claim 9, wherein said position data further includes altitude data of said destination.

14. A physical distribution control system as claimed in claim 9, wherein said sites include deliverers, each of which further includes:

a map displaying unit and a GPS unit;

converting means for converting said position data from said recording medium into map position data; and displaying means for displaying a present position from said GPS unit and said map position data on said map displaying unit.

15. A physical distribution control system as claimed in claim 9, wherein said sites include deliverers, each of which further includes:

a reader for reading said position data and a GPS unit;

comparing means for comparing said position data with present position data from said GPS unit when said freight is handled; and outputting means for outputting a result of said comparison.

16. A physical distribution control system, comprising:

sites for receiving, forwarding, and delivering freight;

recording means for recording position data including latitude and longitude destination data of said freight on a recording medium provided to said freight; and control means for controlling said physical distribution system based on said position data to receive, forward, and deliver said freight, wherein each of said sites comprising:

a reader for reading said position data on said recording medium;

converting means for converting said position data into language data in a language used within an area of one of said sites dealing with said freight; and indicating means for indicating said position data with said language data.

* * * * *